United States Patent [19]

Furukawa et al.

[11] Patent Number: 5,268,889
[45] Date of Patent: Dec. 7, 1993

[54] DISPLAY DEVICE FOR A COMPACT DISC PLAYER AND A COMPACT DISC

[75] Inventors: Masamichi Furukawa; Takurou Sone, both of Hamamatsu, Japan

[73] Assignee: Yamaha Corporation, Hamamatsu, Japan

[21] Appl. No.: 718,551

[22] Filed: Jun. 20, 1991

[30] Foreign Application Priority Data

Jun. 21, 1990 [JP] Japan .................................. 2-163635
Dec. 7, 1990 [JP] Japan .................................. 2-406237

[51] Int. Cl.$^5$ ............................................. G11B 27/00
[52] U.S. Cl. ..................................................... 369/47
[58] Field of Search ................. 358/335, 342; 369/59, 369/124, 48, 49; 360/27

[56] References Cited

U.S. PATENT DOCUMENTS

| 4,575,770 | 3/1986 | Dieterich | 358/342 |
| 4,587,643 | 5/1986 | Monen et al. | 369/59 |
| 4,953,035 | 8/1990 | Yoshio | 359/335 |
| 4,992,886 | 2/1991 | Klappert | 358/342 |

Primary Examiner—Donald E. McElheny, Jr.
Attorney, Agent, or Firm—Spensley Horn Jubas & Lubitz

[57] ABSTRACT

A display device for a Compact Disc player includes a Q-channel information detection circuit, a specific information identifying circuit, an information sorting circuit, a character code train output circuit and a display. The Q-channel information detection circuit detects Q-channel information subcoding from a signal recorded on a Compact Disc reproduced by the Compact Disc player. The specific information identifying circuit identifies specific information by means of identifying code imparted thereto. The information sorting circuit sorts the specific information provided from the specific information identifying circuit into character code information and editing information. The character code train output circuit edits the character code information in accordance with the editing information as character information and the display indicates the character information concerning contents of the Compact Disc such as the title, name of the composer or performer. The display device also includes an image information processing circuit which detects image information from Q and R to W-channels on the Compact Disc and displays mixed information of character information and image information.

10 Claims, 13 Drawing Sheets

FIG. 2a  CD FORMAT

FIG. 2b  SUBCODING BLOCK

FIG. 2c  Q SUBCODING DATA

DATA FORMAT IN MODE 5
(ADR = 0101)
CONTROL BLOCK (CB)
DC = 00

BASIC CHARACTER BLOCK (BC)
DC = 10

OPTIONAL CHARACTER BLOCK (OC)
DC = 11
CC = 000001 (CHINESE CHARACTER)

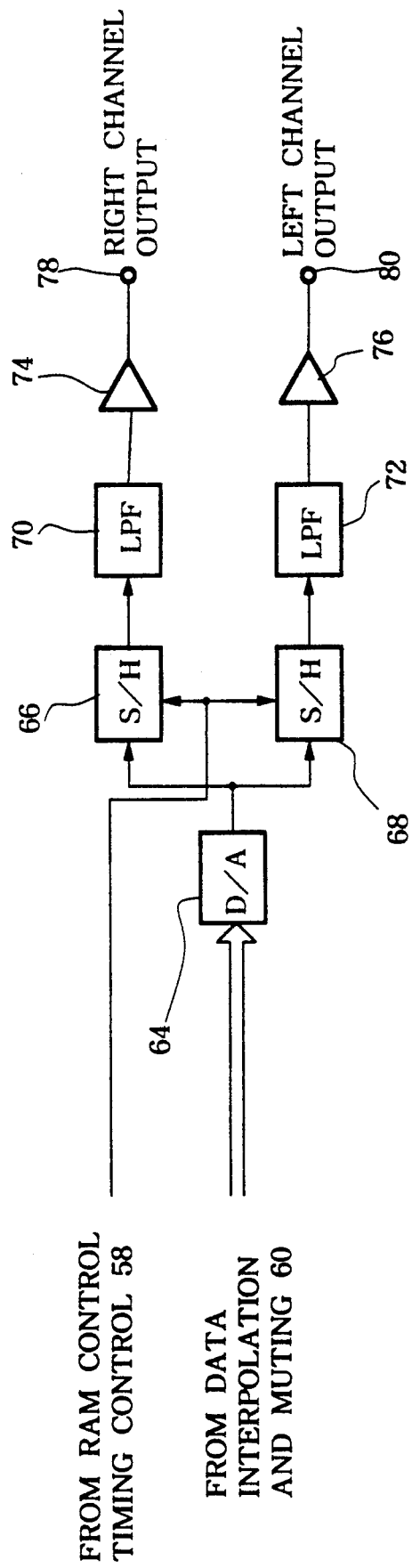
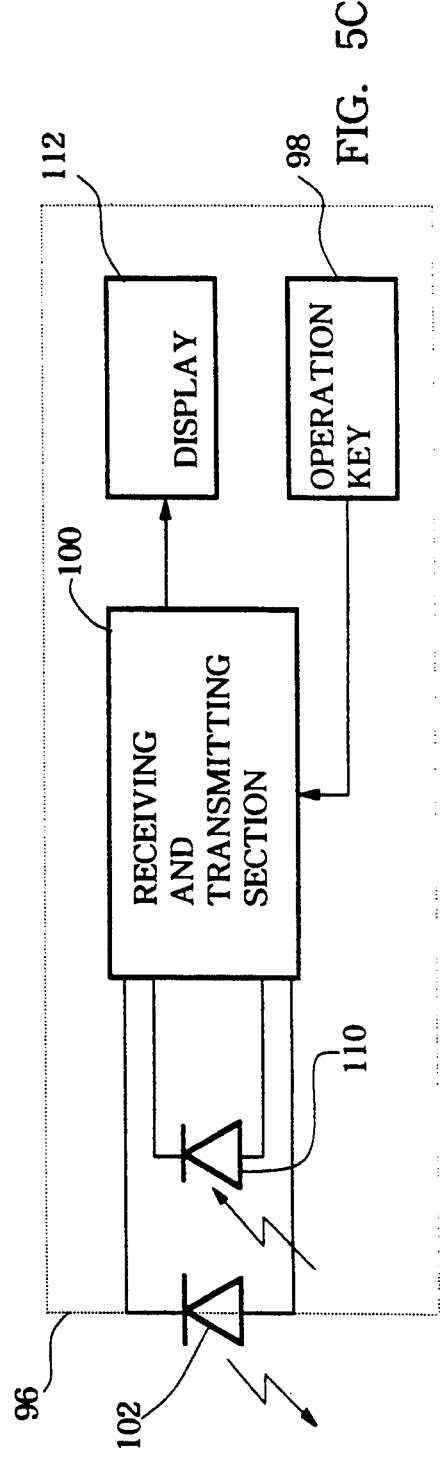
FIG. 5B
FIG. 5C

Q-CHANNEL DATA OF TYPE 1

Q-CHANNEL DATA OF TYPE 2

Q-CHANNEL DATA OF TYPE 3

DISPLAY DEVICE FOR A COMPACT DISC PLAYER AND A COMPACT DISC

BACKGROUND OF THE INVENTION

This invention relates to a display device for a compact disc player capable of displaying character information and, optionally image information in addition thereto, concerning information about music such as the title, name of the composer or performer. The invention relates also to a Compact Disc having novel Q subcoding data for displaying such character or image information. The display device and Compact Disc according to the invention realize such display by addition of only a small amount of information to a currently available Compact Disc data format.

In a conventional Compact Disc player, various displays are made based on data reproduced from a Compact Disc for convenience in using a Compact Disc.

Displays in the conventional Compact Disc player are based on reproduced data from the disc. They have a TNO (track number and music program number) display and TIME (time) display which are based on data recorded as Mode 1 in the Q-channel subcoding.

There is another type of display utilizing a Compact Disc graphics technique (standard). According to this type of display, line graphic information is recorded by using R to W-channel subcodings. Music words using a character font or a still picture may be displayed.

The display using the Q-channel subcoding Mode 1 can only display a music program number and time information. The display has no function of displaying data concerning a music program such as the title of music, names of the composer and performer in which the listener really wishes to know while he listens to the music program.

The display using the Compact Disc graphics technique requires an external device such as a television monitor to act as a display device and it is basically impossible to display information by a Compact Disc player itself. Besides, since this type of display requires the employment of R to W-channel subcodings which are not normally used, an additional LSI must be incorporated in the display device for performing processing in the R to W-channel the result that manufacturing costs of the hardware increase. Moreover, since the data used in the Compact Disc graphics is not code data but graphic data, this data cannot be utilized for retrieval of data (such as queing). Further, since preparation of graphic data is mostly by hand, preparation of necessary software is extremely labor-consuming. For these reasons, the display using the Compact Disc graphics technique is not commonly employed.

It is an object of the present invention to eliminate the above described drawbacks of the conventional display devices of the Compact Disc player and provide a display device for a Compact Disc player and a Compact Disc adapted for use in a Compact Disc player. The present invention incorporates such a display device to realize a display of contents of a music program such as the title, the names of composer and performer of a music program at a moderate cost by adding only a small amount of information to the currently available Compact Disc data format.

SUMMARY OF THE INVENTION

For achieving the above described object of the invention, the display device for a Compact Disc player according to the present invention comprises audio signal reproduction means for detecting digital audio data recorded on a Compact Disc and reproducing an audio signal corresponding to the digital audio data. Q-channel information detection means are used for detecting and outputting Q-channel information of subcoding data recorded on the Compact Disc in parallel with detection and reproduction by the audio signal reproduction means. Specific information are used identifying means for identifying specific information consisting of a character code for corresponding contents of the audio signal from an output of the Q-channel information detection means by means of an identifying code imparted to the specific information and outputting identified specific information having character code information and editing information. Information sorting means for used for sorting the identified specific information into character code information and editing information, character code train output means for editing the character code information provided by the information sorting means as a displayable character code train in accordance with the editing information and outputting the character code train. And display means used for displaying the character code train provided by the character code train output means.

According to the display device of the present invention, Q-channel information is detected from a signal reproduced from the Compact Disc by the Q-channel information detection means. Specific information concerning contents of digital audio data of the Compact Disc is identified from the Q-channel information by means of an identifying code by the specific information identifying means. The specific information is sorted into character code information and editing information by the information sorting means. The character code information is edited to a character train which can be externally displayed in accordance with the editing information and delivered out by the character code train output means and displayed by the display means. As the character code information, various information concerning contents of the Compact Disc such as a disc title (title of the disc), music program title (title of each specific music program) and the names of composer and performer may be employed.

According to the invention, information concerning the Compact Disc which the user wishes to know can be displayed in parallel with playback of the program of the disc. Since character information is recorded, reproduced and displayed by utilizing the Q-channel subcoding, the display can be realized by adding only a small amount of data to the current Compact Disc data format. Accordingly, the circuit design for displaying character information can be realized at a substantially reduced cost as compared with the conventional display devices.

Since information concerning contents of the Compact Disc is recorded in the form of a code, this information can be utilized for retrieval of data so that this provides an additional benefit to the user.

Since the character pattern can be determined solely by the software used in the Compact Disc player and the Compact Disc has only to record the code, preparation of recorded information is simplified as compared with the Compact Disc graphics technique.

Since character information is recorded by utilizing the Q-channel subcoding which is always provided in the Compact Disc format, the total amount of data in the Compact Disc satisfies necessity without waste. Besides, editing of the character information with the editing information improves data efficiency and contributes to a small amount of instantaneous data transmission.

According to one aspect of the present invention, there is provided a display device which has the above described feature of the present invention and further comprises image information detection means for detecting and outputting image information recorded on subcoding channels other than the Q-channel of the Compact Disc in parallel with reproduction of the digital audio data by the reproduction and output means. Image control information detection means for detecting image control information for displaying the image information from a character code train detected by the Q-channel information detection means, and image output means responsive to the image control information detected by the image control information detection means for supplying the image information detected by the image information detection means to the display means.

According to the display device of this aspect of the present invention, image information recorded in subcoding channels other than the Q-channel subcoding in the Compact Disc is detected and provided by the image information detection means in parallel with the reproduction by the above described reproduction and output means. Image control information for displaying the image information is detected by the image control information detection means from the character code train detected by the Q-channel information detection means. In response to this image control information, the image information which has been provided by the image information detection means is delivered from the image output means and displayed by the display means.

According to this aspect of the present invention, a mixed display of character information and image information can be realized and, as a result, the display ability of the Compact Disc player is reinforced and improved, as compared with a case where only the character information is displayed and the quality of display thereby is improved. Further, since the character information is mixed, recording efficiency is higher than in a case where display is made only by the image information (because the character information can display much information with a small amount of data) so that the speed of reproducing display information can be increased. Besides, since the character information is mixed as code information, this information can be utilized for retrieval of data.

In the Compact Disc achieving the above described object of the present invention, character code information representing contents of a corresponding music and editing information are recorded with identifying codes therefor in subcoding Q-channel data frames of a program region.

Since the display of the character information can be made by adding only a small amount of data to the currently available Compact Disc data format, production of the software for the Compact Disc realizing the present invention can be made by using the currently available software, so that the Compact Disc according to the invention can be readily manufactured.

According to one aspect of the present invention, information concerning contents of a music program is recorded in at most eight per one hundred frames of the Q-channel data frames of the Compact Disc. Accordingly, display of a music program number and time information according to the Mode 1 in the conventional Compact Disc data format can also be performed without interfering with the display of the character information.

According to still another aspect of the present invention, the ASCII code is used as the character code and this enables an efficient recording of character information.

Preferred embodiments of the invention will now be described with reference to the accompanying drawings.

BRIEF DESCRIPTION OF THE DRAWINGS

In the accompanying drawings,

FIGS. 2a to 2f are diagrams showing an example of a Compact Disc data format used in the invention;

FIGS. 5A to 5C are block diagrams showing the entire construction of a Compact Disc player incorporating the display device of this embodiment;

DESCRIPTION OF PREFERRED EMBODIMENTS

An example of a Compact Disc data format used in the present invention is shown in FIG. 2. In this data format, one frame consists of 588 channel bits as shown in FIG. 2a, each frame having a subcoding area of one symbol (8 bits). The subcoding is constructed so that it is completed with 98 frames and includes, as shown in FIG. 2b, eight channels P, Q, . . . W, each channel consisting of 98 bits.

The Q-channel is constructed as shown in FIG. 2c. The mode is designated by ADR (address). Mode 1 (ADR=0001) to Mode 3 (ADR=0011) have already been defined in the conventional Compact Disc data format. In this example, Mode 5 (0101) is newly defined as the character display mode in the present invention. By restricting the rate of appearance of the Mode 5 to at most 8/100, reproduction of the already defined Modes 1 to 3 can be performed without any trouble.

Figure 2D:
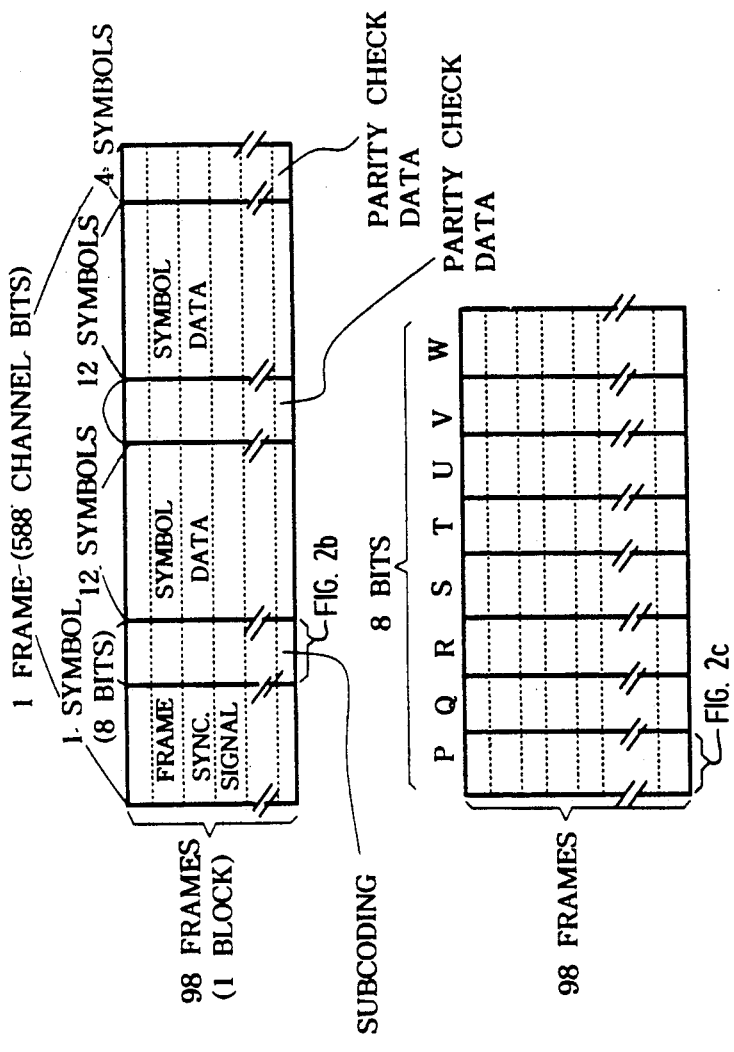
Figure 2D:
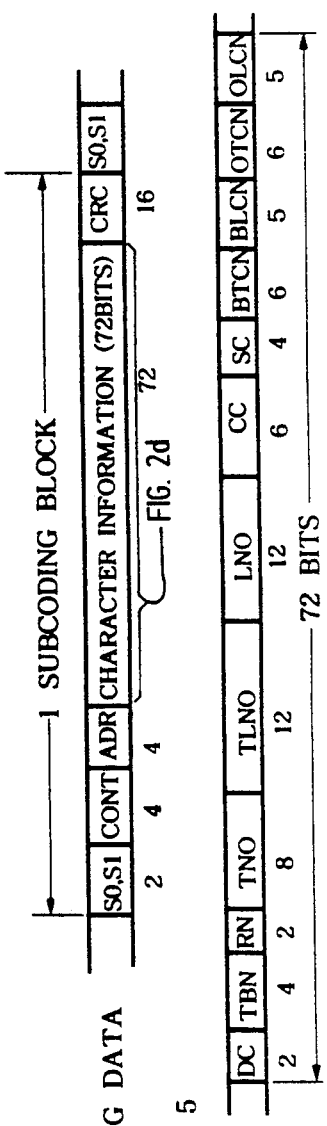
Figure 2E:
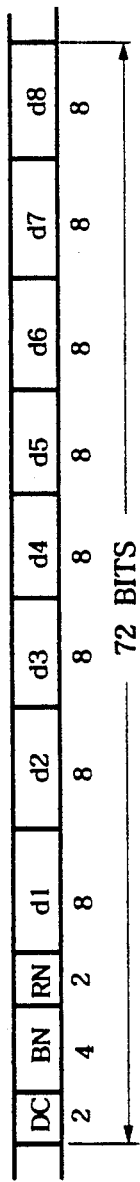
Figure 2F:
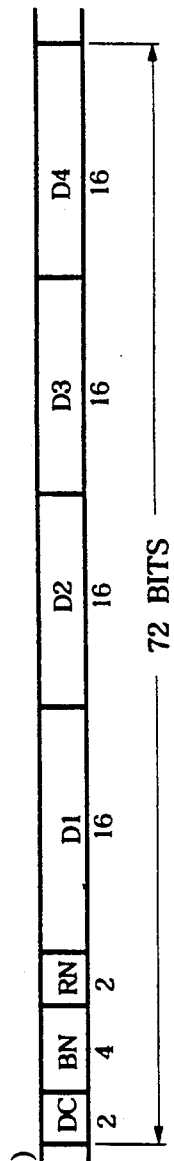

Contents of data blocks (each 72 bits) in the Mode 5 are shown in FIGS. 2d to 2f. Data signals (specific information) in the Mode 5 consist of three types of data blocks shown in FIGS. 2d to 2f. These blocks are classified into the following blocks depending upon the initial two bits (DC):

DC: Data Contents (indicating contents of the recorded block)
00: CB: Control Block (i.e., editing information) indicating that this data block consists of control data used for display of characters
10: BC: Basic Character Block (i.e., character code information (ASCII: American Standard Code for Information and Interchange)) indicating that this data block consists 8-bit ASCII alphabetic character and figure codes used as the basic characters
11: OC: Optional Character Block (i.e., character code information (e.g., JIS (Japanese Industrial Standard) Chinese characters)) indicating that this data block consists of e.g., 16-bit JIS Chinese character codes used as the optional characters Data formats in the respective data blocks will now be described.

(1) Data format in the Control Block CB (FIG. 2d)
i) TBN: Total Block Number (4 bits)
This data indicates the number of blocks constituting one character line (one block consisting of 8 characters in the case of the basic characters and 4 characters in the case of the optional characters). The number of the control block is not counted.

```
0001: 1 block
0010: 2 blocks
  :    :
1111: 15 blocks
``` ii) RN: Repeat Number (2 bits)
This data indicates whether the character code data is the first occurring one or second occurring one of data written twice for preventing reading error.
01: first occurring data
10: second occurring data iii) TNO: Track Number (8 bits)
This data indicates the music program number of the displayed music program. This data only is constructed of the BCD code. This TNO basically coincides with TNO of Mode 1. In a case, however, where, as will be described later, music program number information of a succeeding music program is inserted before the preceding music program is over, an arrangement is made so that the display of the music program number will be started from a time point when TNO in the Mode 1 coincides with TNO in the Mode 5.

0000 0000: The character line on which this TNO is recorded indicates that the displayed data is one which is common through all music programs contained in the disc such as the disc title and the name of the singer and can be displayed any time.

```
0000 0001: first music program ─┐
   :                             ├ Data for corresponding
1001 1001: 99-th music program ─┘  music program
```

-continued 1111 1111: This data is used when the characters are to be displayed in real time while the data is read by the Compact Disc player (e.g., words of a "karaoke" (sing-along machine))

iv) TLNO: Total Line Number (12 bits)
This data indicates the number of lines of character lines recorded for the particular music program.

```
0000 0000 0000: No character is recorded.
0000 0000 0001: one line
      :            :
1111 1111 1111: 4027 lines
``` v) CC: Character Code (6 bits)
This data indicates a decode code for the optional characters (e.g., Chinese characters).

```
00 0000: The data consists of the basic character
         blocks only and no optional character is
         recorded.
00 0001: Chinese characters are recorded as the
         optional characters.
00 0010: Not allotted yet. Depending upon the
   :     character code established, a block of
   :     characters of 8-bit unit which is the same
   :     as the basic character block is
   :     conceivable (e.g., Japanese Hiragana or
11 1111: Katakana character or other characters).
``` vi) SC: Select Code (4 bits)
This data is a classifying code indicating contents of data on the displayed character line.

```
0000: Title of the disc
0001: Title of the displayed music program
0010: Name of the composer
0011: Name of the writer of the song
0100: Name of the arranger
0101: Name of the conductor
0110: Name of the main vocal
0111: Name of orchestra
1000: Hall where the music is performed
1010: Mixer
  :
1111:
``` vii) BTCN: Basic Total Character Number (6 bits)
This data indicates the number of characters included in the character line (basic character line). By using this data, the characters can be displayed in a well-balanced arrangement on the display.

```
00 0000: one character
   :        :
11 1111: 63 characters
``` viii) BLCN: Basic Line Change Number (6 bits)
This data indicates a character position at which a new line should be made in the displayed character line, that is, the starting position of a character at which a new line may be made which is indicated by the number counted from the first character. By using this data, character information can be displayed in a well-balanced arrangement even in a case where the number of digits of the display of the Compact Disc player is smaller than the number of characters of one line which can be displayed, so that selection of a display in the Compact Disc player can be made with a greater degree of freedom.

00 0000: A new line may be made at any character.
00 0010: A new line may be made at the second character.
00 0011: A new line may be made at the third character.
: :
11 1111: A new line may be made at the sixty-third character.

ix) OTCN: Optional Total Character Number (5 bits)

This data indicates the number of characters included in the character line of the optional characters (optional character line).

0 0000: There is no optional character.
0 0001: 1 character
: :
1 1111: 31 characters x) OLCN: Optional Line Change Number (6 bits)

This data indicates a character at which a new line should be made in the displayed optional character line, that is, the starting position of a character at which a new line may be made which is indicated by the number counted from the first character.

00 0000: A new line may be made at any character.
00 0010: A new line may be made at the second character.
0 0011: A new line may be made at the third character.
: :
1 1111: A new line may be made at the 31st character.

(2) Data format in the basic character block BC (FIG. 2e)

i) BN: Block Number (4 bits)

This data indicates the order (position) of the particular block in one character line. The control block is not included in this order. A twice written block is counted as one block.

0001: first character block
0010: second block
: :
1111: fifteenth block ii) RN: Repeat Number (2 bits)
(the same as RN in the control block)

iii) d1 to d8: alphabetic character and figure data according to ASCII code of 8 bits.

0000 0000
: : ] alphabetic characters and figures according to ASCII code
1111 1110

1111 1111: Non-operation. Display of characters is not made but a stand-by state is brought about in a portion where this data is recorded. This data is different from a space indication in that, when next data has arrived, the data is indicated after the preceding data without space. This data is not counted as the character number.
This data is used for adjusting data when the number of characters in one line cannot be divided by the block number. The data is used also for adjusting the timing of display such as when characters are displayed in real time.

(3) Data format in the optional character block OC (FIG. 2f)

i) BN: Block Number (4 bits) (the same as BN in the basic character block)

ii) RN: Repeat Number (2 bits) (the same as RN in the basic character block)

iii) D1 to D4: Chinese character data according to JIS code of 16 bits 0000 0000 0000 0000
: ] JIS Chinese character code
1111 1111 1111 1110

1111 1111 1111 1111: This data performs the same function as the non-operation data in the basic character block.

In the character display of Q-channel Mode 5, the basic character block is always recorded so that display of at least alphabetic characters and figures can be made even in a low-cost Compact Disc player. Recording of the optional characters is made optionally. Thus, display matching the grade of the Compact Disc player can be achieved.

By constructing the respective data blocks in the above described manner, the following benefits can be derived:

(a) Modification of the current data format can be held to a minimum.

The present invention can be achieved by merely adding the new Mode 5 to the Q-channel subcoding, so that there is complete compatibility between the data format of the present invention and the current data format. No problem will occur if the Compact Disc of the present invention is played back by a conventional Compact Disc player.

Since data of the data format of the present invention is recorded by using the Q-channel subcoding which is always inserted in the Compact Disc format, the total amount of data satisfies all needs without waste. If display of an item such as " 作 曲 者 " (meaning a composer) was recorded in each of the three types of blocks by JIS Chinese code, for example, $16 \times 3 = 48$ bits would be required for this purpose only. Since, according to the present invention, the same purpose can be achieved by merely allotting the editing information SC "0010" of 4 bits in the control data, data efficiency as a whole is thereby improved and display can be made effectively with a minimum amount of data transmission. Further, the display of the present invention can be achieved without increasing the speed of data transmission so that the current standard can be used without modification.

(b) No development of new parts (LSI) is necessary for coping with the new data format.

The conventionally used LSI for signal processing can be used for the new data format by modifying a part of the software.

As to the LSI for display, there is a standard LSI for this purpose and this standard LSI may be used for the purpose of the present invention. The manufacturing cost therefore is relatively low so that the display device of the present invention can be incorporated even in such a low price compact size audio device as a cassette type tape recorder combined with a radio receiver and a Compact Disc player.

(c) Degree of freedom in display in the Compact Disc player is large.

The dot number, line of display and number of characters in one line of characters to be displayed can be selected freely depending upon the type of the player. Accordingly, the manner of display can be selected depending upon the grade of the player ranging from the cassette type tape recorder combined with radio receiver and Compact Disc player to a high class Compact Disc player. Further, by storing data which has once been read by the display device, this data can be utilized for various purposes such as data retrieval.

(d) By designating the classifying code (i.e., Select Code SC in the control data) by operation of an input device by the user, data to be displayed can be selected on the user side of the Compact Disc player.

(e) Production of software is easy

Since the character pattern can be provided by the software used in the Compact Disc player, the Compact Disc production software has only to write data automatically in the production line so that little recording cost is incurred during Compact Disc production.

Figure 3:
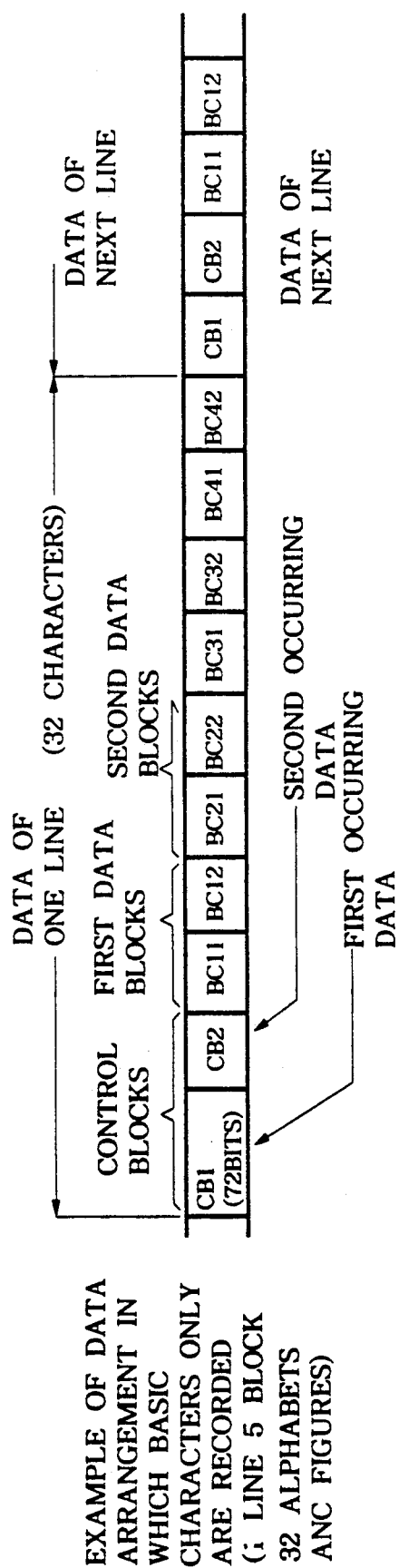
FIG. 3 is a diagram showing an example of data for one line (in the case of the basic character only) according to the invention.
Figure 4:
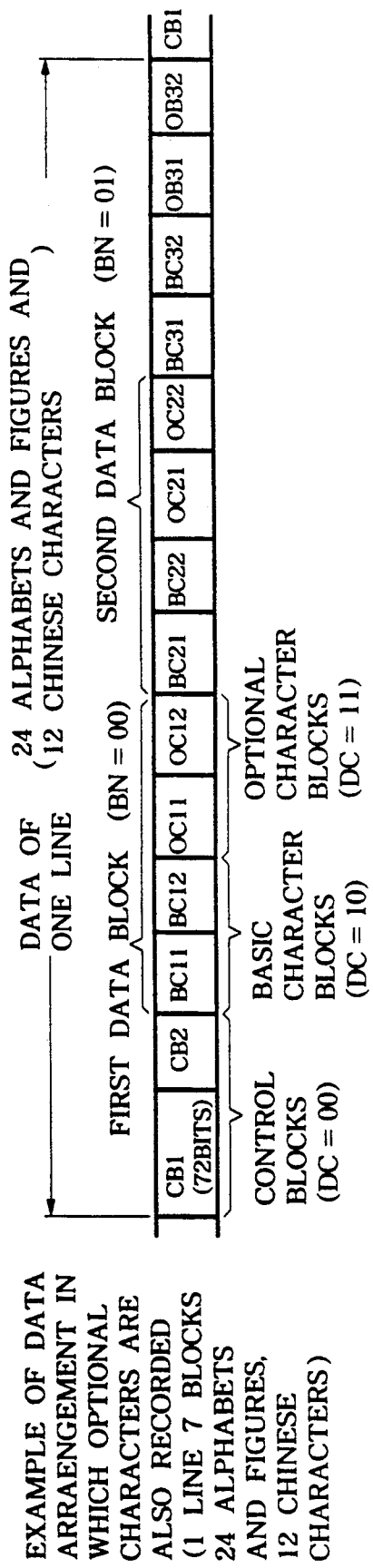
FIG. 4 is a diagram showing an example of data for one line (in the case of the optional character only) according to the invention.

An example of character line data made of a combination of the above described three types of data blocks is shown in FIGS. 3 and 4. FIG. 3 shows data consisting of basic characters only and FIG. 4 shows a case where optional characters are additionally recorded. In FIGS. 3 and 4, each block consists of 72 bits and is made of either one of the three types of data blocks (FIGS. 2d, 2e and 2f). A series of line data is constructed by detecting and connecting data blocks (Q-channel subcoding data of Mode 5) which are dispersedly inserted in the Q-channel subcoding at the rate of appearance of at most 8/100.

A control block is provided at the head of data for one line and is followed by character blocks. In each block, the same data is repeatedly recorded (twice in the present embodiment) for preventing reading errors.

Upon completion of recording of data for one line, the select code SC in the control block is changed and data of different contents thereby is successively recorded. Upon completion of recording of a series of data once by sequential change of SC, SC is restored to the initial one and the same data is repeatedly recorded so long as the same music program continues. Information which is common through the entire disc such as the disc title and the name of the singer also is repeatedly recorded. By this arrangement, a proper display can be made even when playback is made from a midway point of the music program. Even if a reading error has occurred temporarily, a correct display can be made if correct information is reproduced thereafter. Since data is always received during performance of the music program, the total amount of data satisfies all needs without waste. Besides, editing by means of the editing information increases data efficiency with the result that the amount of instantaneous data transmission can be held to a minimum.

In the case of FIG. 3 in which the data is constructed of the basic characters only, the basic character block follows the initial control block. The control block in FIG. 3 becomes TBN=0100 (constructed of one line, 4 blocks)
CC=00 0000 (constructed only of basic blocks)
BTCN=10 0000 (the basic character line is constructed of 32 characters)
OTCN=0 0000 (no optional characters).

When one line is set at 15 blocks (the maximum value of TBN is 1111) with only the basic characters, data is constructed of 8 characters (i.e., the number of characters of one block)×15 blocks=120 characters.

In FIG. 4 in which the optional characters are recorded also, the initial control block is followed alternately by the basic character block and the optional character block. The control block in FIG. 4 becomes TBN=0110 (constructed of one line, 6 blocks)
CC=00 0001 (optional characters are recorded)
BTCN=01 1000 (the basic character line is constructed of 24 characters)
OTCN=0 1100 (the optional character line is constructed of 12 characters).

As to TBN in the control block, there may be a case where it is more convenient to count the number of the basic character blocks and the number of the optional character blocks separately.

By recording always the basic characters also in recording the optional characters as in FIG. 4, alphabetic characters and figures can at least be displayed in a low-cost display device which cannot display the optional characters. In a case where the optional characters can be displayed, it will be more convenient if the user can switch the manner of display to either or both of the two types of display.

When one line is set at 15 blocks (the maximum value of TBN is 1111), the optional characters such as Chinese characters which consist of 16 bits can be recorded up to 4 characters×15 blocks=60 characters.

The display speed in the cases of FIGS. 3 and 4, for example, becomes as follows:

Speed of reproduction of subcoding block: 75 blocks/sec.
Rate of appearance of the Q-channel subcoding of Mode 5: 5/100
Number of the character codes:
    4 characters/block (Chinese characters)
    8 characters/block (alphabetic characters and figures)
Number of characters which can be recorded:
    75×5/100×4=15 characters/sec. (Chinese characters)
    75×5/100×8=30 characters/sec. (alphabetic characters and figures)
Amount of characters which can be displayed (written twice):
    15/2=7.5 characters/sec. (Chinese characters)
    30/2=15 characters/sec. (alphabetic characters and figures)

Reproduction of one line data made at this display speed will take some time before completion so that there arises a problem that it will take some time from start of reproduction of a music program until display of the contents of the music program. This problem can be solved if the data transmission rate is made higher but this will require an extremely large transmission capacity and therefore is not practicable. In the present embodiment, an arrangement is made so that character code information and data of music program number (TNO) of a next music program are recorded in the Q-channel subcoding of Mode 5 at a position before the heading position of the next music program starts (i.e., before the preceding music program ends) and the character code information of the next music program is already reproduced and stored before the next music program starts. By this arrangement, the stored data is displayed when TNO of Mode 1 has coincided with TNO of Mode 5 whereby data of a low rate can be displayed at a high rate in appearance.

An error check during reproduction is made by employing a CRC check code (FIG. 2c). Additionally, whether or not the same data is obtained twice is detected and only correct data is displayed. By effecting such double check, occurrence of an abnormal display can be prevented.

The Q-channel subcoding data can be recorded in a package in a lead-in area of a Compact Disc as well as in the music program. This enables all contents of a music program to be displayed immediately upon loading of the Compact Disc in the Compact Disc player. If the lead-in area is too narrow to have all data recorded, minimum necessary data such as the title of music program of each music program number can be recorded in the lead-in area.

The entire construction of an example of a Compact Disc player incorporating the display device of the invention will now be described with reference to FIG. 5.

Figure 5A:
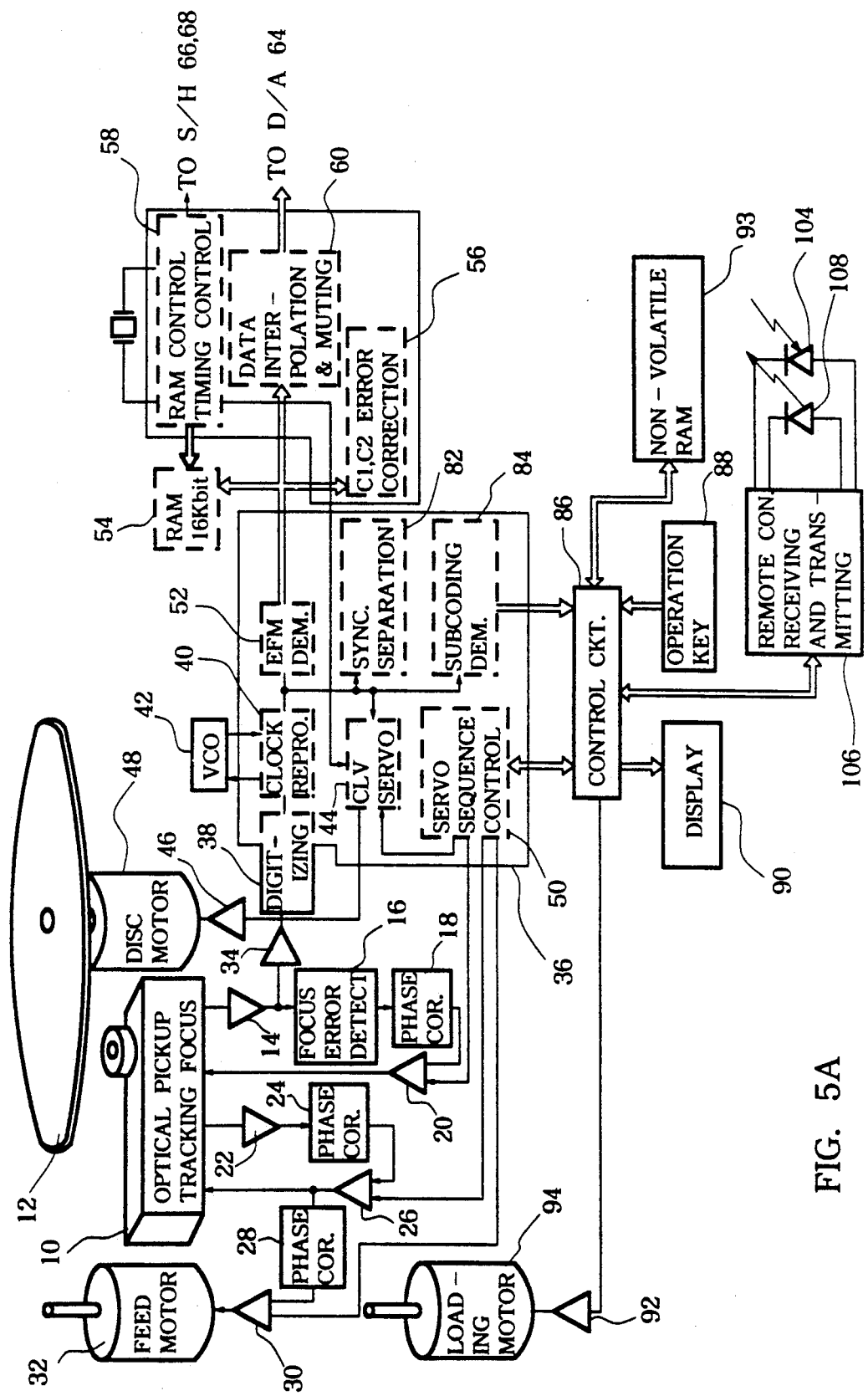

In FIGS. 5A to 5C, an optical pickup 10 irradiates a laser beam on a Compact Disc (hereinafter referred to as "disc") 12 and receives a reflected beam therefrom. A received beam signal is applied to a focus error detection circuit 16 through a preamplifier 14 and a focus error is detected by the circuit 16. The focus error signal is supplied to a focus actuator in the optical pickup 10 through a phase correction circuit 18 and a drive amplifier 20 and a focus adjusting control is made by a focus servo. A tracking error signal is supplied to a tracking actuator in the optical pickup 10 through a preamplifier 22, a phase correction circuit 24 and drive amplifier 26 whereby a tracking control is made by a tracking servo.

The tracking error signal from the drive amplifier 26 is also supplied to a feed motor 32 through a phase correction circuit 28 and a drive amplifier 30 and a feed control is made by a feed servo.

A record signal (HF signal) which has been detected by the optical pickup is applied to a digital IC 36 through an HF amplifier 34. In the digital IC 36, the HF signal is rectified in wave by a digitizing circuit 38 for enabling subsequent digital processing and thereafter is compared by a clock reproduction circuit 40 with a reference frequency from a VCO 42. Output of the circuit 40 which represents the result of the comparison is supplied to a disc motor 48 through a CLV servo circuit 44 and a drive amplifier 46 for controlling the disc motor 48 and thereby controlling the disc 12 at a constant linear velocity.

A servo sequence controller 50 sequence-controls the focus servo, tracking servo, feed servo and disc rotation servo.

A signal reproduced from the disc 12 (hereinafter referred to as "reproduced signal") is EFM-demodulated by an EFM demodulation circuit 52 and thereafter is stored once in a RAM 54. C1, C2 error correction of the reproduced signal is made by an error correction circuit 56 and thereafter data of the reproduced signal is read out sequentially at an accurate period by a RAM control timing control circuit 58. The read out data is subjected to data interpolation and data muting, if necessary, by a data interpolation and muting circuit 60. The output of the circuit 60 is converted to an analog signal by a digital-to-analog converter 64 and thereafter is distributed to left and right channels by sample and hold circuits 66 and 68. The left and right channel signals are supplied to output terminals 78 and 80 through low-pass filters 70 and 72 and amplifiers 74 and 76.

A synchronizing signal separation circuit 82 separates a synchronizing signal from the reproduced signal and a subcoding demodulation circuit 84 demodulates a subcoding from the reproduced signal.

A control circuit 86 controls the respective circuits in accordance with operations of an operation key 88 and a remote controller 96 (shown in FIG. 5c) by a user and displays information based on the demodulated subcoding on a display 90. The control circuit 86 also drives a loading motor 94 through a drive amplifier 92 to control loading of a disc tray (not shown).

The remote controller 96 in this embodiment constitutes a bidirectional remote controller with the Compact Disc player. The remote controller 96 includes an operation key 98 and outputs a command signal prepared by operating the operation key 98 from a remote controller receiving and transmitting section 100 and transmits the command signal from an infrared projection section 102. The Compact Disc player has an infrared receiving section 104 which receives the infrared signal from the remote controller 96 and supplies the received signal to the control circuit 86 through a remote controller receiving and transmitting section 106 for implementation of the commanded function.

Display information reproduced by the Compact Disc player is supplied to the remote controller receiving and transmitting section 106 and transmitted from the infrared projection section 108. This infrared signal is received by an infrared receiving section 110 of the remote controller 96 and displayed on a display 112 through the remote controller receiving and transmitting section 100.

A non-volatile RAM 93 stores display information based on the Q-channel subcoding of Mode 1 and Mode 5 reproduced from the disc 12. The display information is read from the non-volatile RAM 93 by operation of the operation key 88 of the Compact Disc player or the operation key 98 of the remote controller 96 and utilized for various purposes including retrieval and display of the reproduced position on the disc 12.

Figure 1:
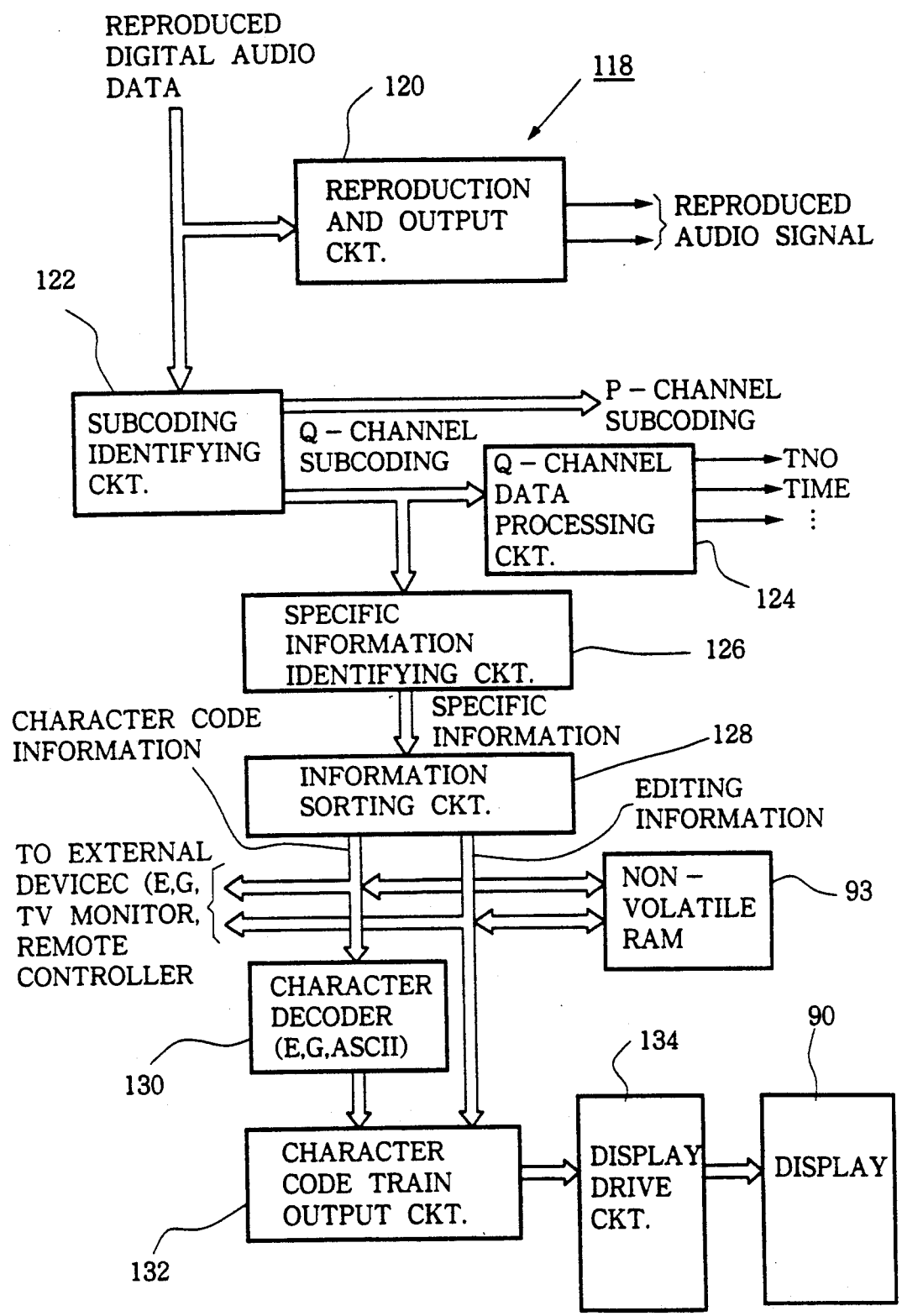
FIG. 1 is a block diagram showing an embodiment of the display device according to the invention.

An embodiment of the display device of the present invention incorporated in the above described Compact Disc player is shown in FIG. 1. The functions of this display device can be performed by the circuits such as the digital IC 36 and the control circuit 86 shown in FIG. 5A.

In a character display circuit 118, digital audio data reproduced from a Compact Disc is demodulated to an audio signal by a reproduction and output circuit 120 (corresponding to a portion including the EFM demodulation circuit 52 and subsequent circuits in FIG. 5A). Subcodings in the digital audio data are detected by a subcoding identifying circuit 122 (corresponding to the subcoding demodulation circuit 84 and related circuits in FIG. 5A) and identified as a P-channel subcoding, Q-channel subcoding, etc.

A Q-channel data processing circuit 124 obtains music program number information TNO and time information TIME by demodulating the Q-channel subcoding of Modes 1 to 3 and displays this information at predetermined positions in a display (display 90 or a display which is provided separately from the display 90).

A specific information identifying circuit 126 identifies the Q-channel subcoding of Mode 5 which is used in the present invention by the identifying information (ADR=0101, see FIG. 2c) and outputs this subcoding. An information sorting circuit 128 sorts the Q-channel subcoding of Mode 5 into character code information (i.e., basic character block data and optional character block data) and editing information (control block data) by means of the DC code (FIGS. 2d to 2f). This information is stored in the non-volatile RAM 93. This information is also provided for enabling display in an external device such as a television monitor.

In the character information, the optional character information in this embodiment of the present invention consists of JIS Chinese character code and the basic character information consists of ASCII code. This information is decoded by a character code decoder 130 to display data of the character patterns corresponding to the respective codes. A character code train output circuit 132 edits the decoded display data by means of the editing information as a character code train which can be displayed by a display. This character code train data is supplied to the display 90 through a display drive circuit 134 so that display of information concerning contents of the music program is made. The display 90 is constructed of a suitable display such as a line display using a dot display, e.g., an LCD (liquid crystal display) or LED (light emitting diode). Display of information according to the present invention can be made by any display that can display one line. Depending upon the grade of the Compact Disc player, display in plural lines can also be made. It is also possible to display by providing a small television monitor using liquid crystal in the Compact Disc player.

The display device of the invention can be realized by using a conventional system except for the provision of the JIS Chinese character decoder and adding software for executing the processing of the Q-channel subcoding of Mode 5.

An example of a character display operation by the character display circuit 118 of FIG. 1 will now be described. In a normal playback condition, an audio signal is reproduced from the disc 12 by the reproduction and output circuit 120. In parallel with this, the P-channel subcoding and the Q-channel subcoding are identified by the subcoding channel identifying circuit 122. The Q-channel subcoding of Mode 1 is demodulated by the Q-channel data processing circuit 124 to the music program information and time information and the demodulated information is displayed by the display 90 or the display which is provided separately from the display 90.

The Q-channel subcoding of Mode 5 is identified by the specific information identifying circuit 126 and sorted into the character code information and editing information by the information sorting circuit 128. The character code information is decoded by the character code decoder 130 and then is arranged by the character code train output circuit 132 to a character code train corresponding to the editing information and is displayed by the display 90 through the display drive circuit 134.

The demodulated character code information and editing information are stored in the non-volatile RAM 93. As described previously, the same character code is repeatedly recorded in the Q-channel subcoding of Mode 5 during reproduction of the same music program and the first character code information is stored in the RAM 93 and necessary character code is read from the RAM 93 and displayed thereafter as long as the same music program continues. As to the secondly occurring data, important data such as the title of the first performed music program may be read and displayed once again and this title may be continuously displayed thereafter. This is because it may irritate the user to display different data again and again during performance of the same music program. When the music program has changed and contents of the character code have therefore changed, the new character code is stored in the RAM 93 and displayed. The character code of the preceding music program also is left in the RAM 93 and is utilized for subsequent display and retrieval of a music program.

As described previously, there are various contents of display which are specified by the SC code. These contents of display are displayed directly in the order of reproduction (if the capacity of the display 90 is small, new contents are displayed after old contents have been erased or, alternatively, displayed by designating the SC code or the contents of display by operation of the operation key 88 or 98. If there is no particular designation, the disc title and the title of music program only (or the title of music program only) may be displayed automatically. In a case where optional characters are recorded, it will be convenient if either one or both of the basic character and the optional character are displayed by a key operation by the user.

Upon completion of reproduction of data from the disc 12, all character information about the disc 12 is stored in the RAM 93 and this storage is left in the RAM 93 even after the disc 12 is detached from the Compact Disc player. The stored information is used for retrieval of a music program the next time the same disc 12 is played back. Since the character code information of the disc 12 has already been stored in the RAM 93, new storing of the character information is not made this time. To prevent overflow of the RAM 93, it will be convenient if data which has become unnecessary is erased from the RAM 93 by a key operation by the user.

For storing character code information in the RAM 93, for example, character code information of different contents may be stored in a package for each music program with a classifying code (SC) imparted to each music program (i.e., character code information is stored for each music program). Alternatively, different character code information for all music programs may be stored in a package for each classifying code (SC) (i.e., character code information is stored for each classifying code). Information of the music program number (TNO) and classifying code (SC) may be expressed by an address at which the information is stored.

In the case of playing back a Compact Disc for which the character code information has already been stored in the RAM 93, the stored information can be effectively utilized. For utilizing this information, for example, the disc title (SC=0000) is automatically reproduced to detect whether the same disc title has already been stored or not. If the disc title has already been stored, a title of a music program corresponding to designation of the music program number (TNO) of the music program is read from the RAM 93 and displayed in accordance with the designation by a key operation by the user. In the case of reproducing and displaying the character code information by detecting the location of the information on the disc, it usually takes some time before the title of the music program is displayed due to the low rate in transmission of the information. By displaying the character code information on the basis of the stored information in the RAM 93, the title of the music program can be displayed instantly upon designation by the key operation. Thus, once the disc title of the loaded disc has been identified, a display corresponding to designation can be made instantly by designating the music program number or classifying code by a key operation (or by designating it by operation of a special key provided for each particular contents of display).

As a specific method for reading the character code information from the RAM 93, in a case where different information is stored in package for each music program, music program information corresponding to a music program number is selected by designation of the music program number and information which is imparted with the designated classifying code is read from among the character code information included in this music program information. In a case where different information is stored for each classifying code, character code information of the designated classifying code is selected and the information corresponding to the designated music program number TNO is read from among this character code information.

By applying the present invention to a Compact Disc player having an automatic changer function, i.e., a function of playing back plural Compact Discs automatically one after another, a disc retrieval can be readily made. In a case where plural Compact Discs are loaded in a conventional automatic changer, it is not possible to store information as to the order of disc and number of music program of a specific music program and, accordingly, an extremely troublesome processing will be required for selecting a desired music program among the plural Compact Discs loaded in the automatic changer. Since the number of music program recorded in the Q-channel subcoding of Mode 1 does not indicate the contents of the music program, selection of a desired music program from among a multiplicity of discs is extremely difficult and this drawback prevents spreading of an automatic changer for a Compact Disc player.

By applying this present invention, a desired music can be instantly detected from among a multiplicity of Compact Discs loaded in an automatic changer. Further, if the present invention is applied to a Compact Disc player having an automatic changer and equipped in an automobile, it will be beneficial because a desired music will be selected by a user seated at an automobile seat even if the automatic changer is located in a trunk of the automobile. An example of such Compact Disc player having an automatic changer equipped in an automobile will be described below.

For all discs loaded in the automatic changer, the title of each disc and location where the disc is set (disc number) which have been reproduced for the first time are stored in combination in a non-volatile RAM (other character code information is also stored). When a disc has been detached from the automatic changer later and the space where the disc has been housed has become empty, the absence of the disc is detected and a flag indicating absence of a disc is marked at a memory address corresponding to the disc number of the detached disc. When a new disc has been set in this place, data of the disc is read and the disc is identified by its disc title and search is made as to whether disc information corresponding to the disc title is present or absent in the RAM. If there is disc information corresponding to the disc title, this information is used as the data of the new disc.

The detection of the disc can be made, for example, by designating the disc title by a key operation (by designating it by alphabet or the like character). In this case, the designated disc title is compared with disc titles stored in the non-volatile RAM and, if there is a disc title which coincides with the designated disc title, a disc of a corresponding location is loaded on a turntable and played back.

Selection of music may also be made by designating a title of a specific music program. In this case, search is made for detecting the designated music program title from among music program titles of all discs stored in the non-volatile RAM; and, if there is a corresponding music program title, a music program number corresponding to the detected music program title is reproduced. Since the disc title of the corresponding disc is also known at this time, this disc title and the music program title are displayed. Selection of music by designating information other than a title of a music program is also possible. Such selection of music by a title of a music program or other information can also be applied to a Compact Disc player which has no automatic changer function.

In a case where the loading position of the disc and the music program number are known, this data may be designated directly by a key operation. In this case, if information of the disc is stored in the non-volatile RAM, the disc title and the music program are instantly displayed and search of the corresponding music program is made.

In the above described manner, by applying the present invention to a Compact Disc player having an automatic changer function, a desired music program can be freely selected. In the first playback of a disc, speed of display is relatively low because some time is required for reading out information. A high speed display can however be made from the second playback of the disc. In an automatic changer in which loaded discs are usually played back several times, the slow speed in response in the first playback will not pose a serious problem.

In applying the present invention, operability of a remote controller can be improved by adopting a bidirectional remote controller as shown in FIG. 5. In a conventional bidirectional remote controller, disc information transmitted from a Compact Disc player by a cable or wireless method is a number of a place where the disc is loaded or a numerical value representing a music program, so that a specific music program which is played back is not known from the remote controller. By applying the present invention, specific information such as the disc title, location of the disc, specific music program and performer's name of the music program can be obtained from the remote controller handled by the user.

A specific example of realizing this by the remote controller 96 of FIG. 5 will be described. In the remote controller 96, upon designating a music program, a signal inquiring about the music program number is issued from the remote controller receiving and transmitting section 100 and transmitted from the projection section 102. A receiving section 104 of the Compact Disc player receives this signal and supplies it to the control circuit 86 through a remote controller receiving and transmitting section 106. The control circuit 86 reads out the music program corresponding to the music program number from the RAM 93 if the music program is stored in the RAM 93. This music program data is issued from a remote controller receiving and transmitting section 108 and transmitted from a projection section 108. The remote controller 96 receives this signal at a receiving section 110 and displays it by a display 112.

In a case where required data has not been stored in the Compact Disc player yet, a signal representing that the data is being read is sent to the remote controller 96 and the music program of the music program number of the disc is played back. When all necessary data has been prepared, the data is sent to the remote controller 96. In this case, the processing is automatically made even when a playback operation signal is not sent to the Compact Disc player and during this processing, the music program is not sounded.

The above described method is one which functions in accordance with inquiry from the remote controller side. Alternatively, data may be sent one-sidedly from the Compact Disc player side. When, for example, the remote controller 96 is in an active state, this fact is transmitted to the Compact Disc player which in turn sends a music program number and title of a music program of a disc loaded in the Compact Disc player to the remote controller 96. The remote controller 96 stores this information and utilizes it for display when it becomes necessary. If the music program number is designated, the title of the music program of this music program number is displayed. Upon start of playback of the disc by designation of playback, momently changing data (such as a music program number and time information of Mode 1) is sent from the Compact Disc player and the remote controller 96 displays it in real time.

The present invention may be applied not only to a Compact Disc player and a Compact Disc but also to other types of discs of a Compact Disc format such as CDV and a player for such discs.

In the above described embodiment, ASCII alphabet and figure code and JIS Chinese character code have been described as examples of codes used. The present invention is not limited to this and other character codes may of course be employed.

An embodiment of the display device of the invention which is capable of performing a mixed display of character information and image information will now be described.

Figures 7A, 7B:
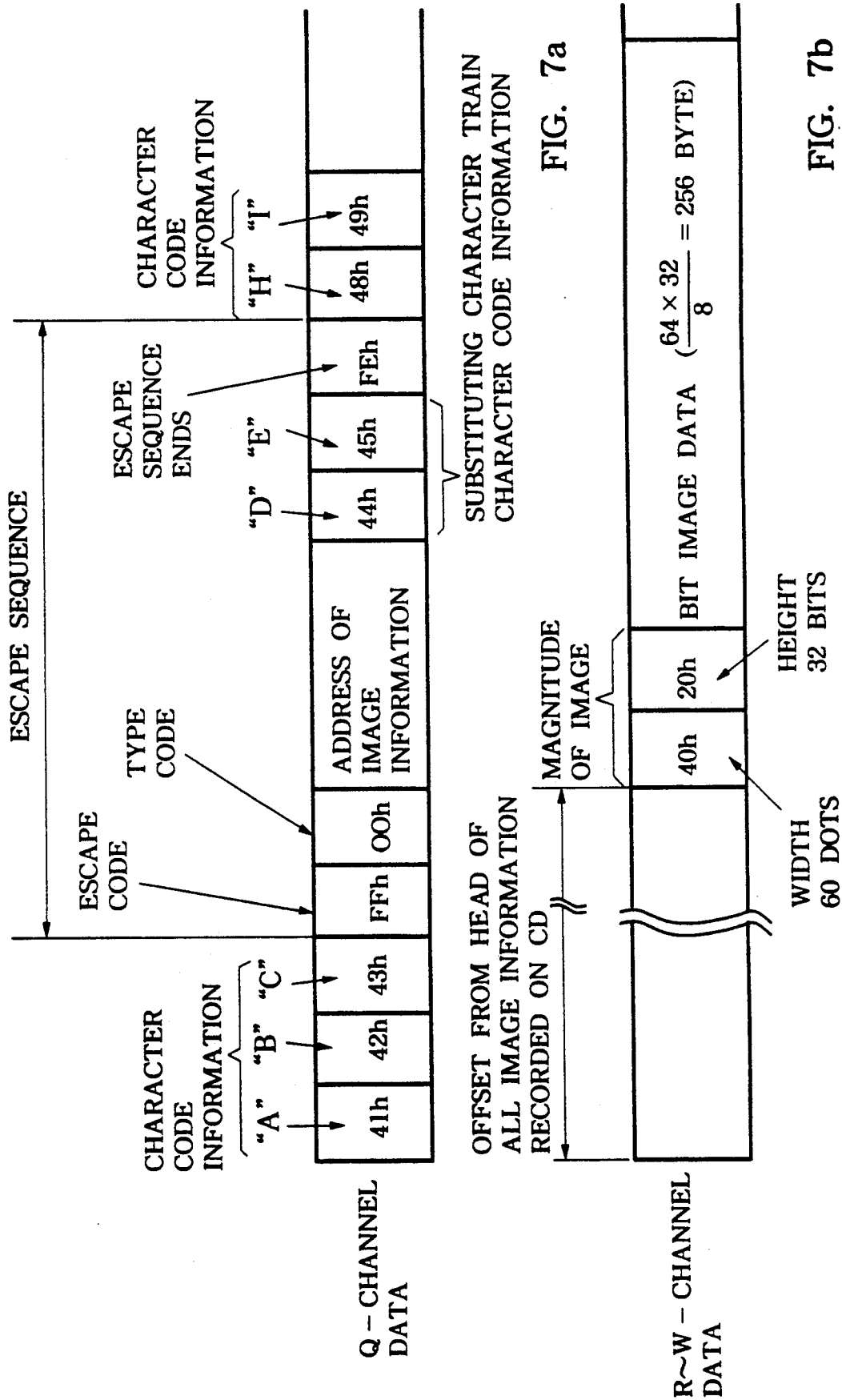
FIG. 7a is a diagram showing an example of an escape sequence of a Q-channel subcoding including image control information.
FIG. 7b is a diagram showing an example of an escape sequence of R to W-channel subcodings including image information.

Referring first to FIGS. 7a and 7b, an example of a data format for performing a mixed display of character information and image information will be described.

For performing such mixed display, image information is recorded in R to W-channel subcodings whereas an escape sequence is inserted in character information of the Q-channel subcoding for recording image control information used for displaying image information.

An example of an escape sequence recorded in the Q-channel subcoding and image information recorded in the R to W-channel subcodings is shown in FIGS. 7a and 7b. In FIGS. 7a and 7b, each data is shown as being written only once but it may be written twice as in data of FIGS. 3 and 4.

In the character code information in the Q-channel, an escape sequence is inserted at a location where image information is to be displayed. If all of one line is displayed with image information, the entire one line becomes the escape sequence. The escape sequence starts with an escape (ESC) code FFh (h signifies a hexadecimal notation) indicating start of the escape sequence and a type code follows it. The type code represents the type of image display and has the following contents:

Type 0 (00 h): Inserted image in character code information. Display position is the same position as recorded position.

Type 1 (01 h): Inserted image in character code information. The inserted position is designated.

Type 2 (02 h): Inserted image in character code information. Attribute information for image is designated.

Type 3 (03 h): Inserted image in character code information. The inserted position and attribute information for image are designated.

The inserted images of the types 0 and 2 are displayed as a part of a character train and a subsequent character train is displayed immediately after the image.

The inserted images of the types 1 and 3 are displayed at designated positions regardless of a character train and do not affect the display position of a subsequent character train.

The escape sequence of FIG. 7a shows a data format of the type 0 in which address information of image information is recorded immediately after the type code 00 h. This address information designates image information to be displayed in this escape sequence and consists of several bytes (e.g., 4 bytes). As this address information, for example, an offset amount (FIG. 7b) counted in bytes or image unit from the head of all image information recorded in the R to W-channel subcodings of a single Compact Disc to a position at which desired image information is recorded can be used.

Following the address information, code information of a substituting character train is recorded. This substituting character train is provided for displaying character information in place of image information in a Compact Disc player whose display capacity is too low to display image information. As the substituting character train, for example, character information corresponding to contents of display by image information is recorded. By this arrangement, at least contents which are to be displayed by image information can be displayed by character information in a Compact Disc player which cannot display image information so that allowance of display capacity of a Compact Disc player can be enlarged.

After the substituting character train, an escape sequence end code FEh is recorded and the escape sequence is thereby completed and the data format returns to character code information.

In the R to W-channel subcodings, image information is recorded. Image information indicating the magnitude (i.e., width and height) of the image is recorded first. Bit image data can be recorded, for example, as bit map data representing the image itself or outline data representing an outline of the image. Image information can also be written twice as in the case of character information.

Since image information is read from a Compact Disc, stored in a RAM and read from the RAM for display by address information of image information in the escape sequence, the record position of the escape sequence in the Q-channel need not be the same position as the record position of the image information in the R to W-channels. By recording, however, image information to be displayed by the escape sequence at a playing back position before the position at which the escape sequence is recorded, when an escape sequence has been read in a case where a Compact Disc is played back for the first time, image information designated by this escape sequence has already been stored in a RAM, so that image information can be displayed in real time. In a case where image information to be displayed by an escape sequence is recorded at a playing back position after the position at which the escape sequence is recorded and the image information to be displayed by the escape sequence has not been stored in the RAM yet when the escape sequence has been read, display may be made by using substituting character information in place of the image information. In this case also, all image information is stored in the RAM once the Compact Disc has been played back so that image information can be displayed in real time in the second and subsequent playback.

As the address of image information, an offset amount from the head of all image information in playing back a Compact Disc from the beginning is counted, for example, bytes may be used and this address information is given to image information read from the Compact Disc and stored in the RAM. Alternatively, address information may be imparted previously to each image information and recorded in the R to W-channel subcodings. By the latter arrangement, image information can be stored with address information even when a Compact Disc is played back from midway for the first time.

In the example shown in FIG. 7b, the data representing the magnitude of image is recorded in the R to W-channels. This data may be recorded in the escape sequence in the Q-channel. If, however, this data is recorded in the R to W-channel in combination with bit image data, the recording efficiency will be better because in this case it is not necessary to designate the magnitude of the image in each escape sequence.

Figures 8A, 8B:
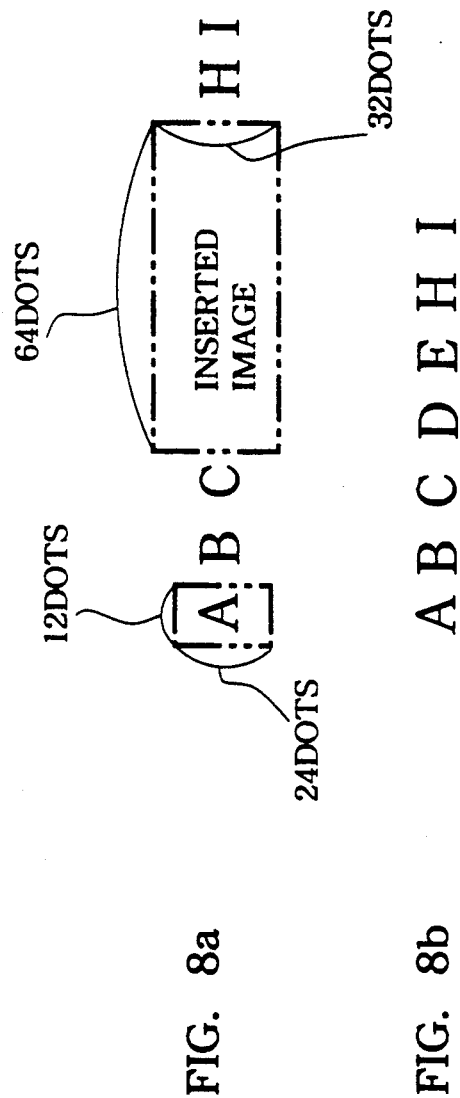
FIGS. 8a and 8b are diagrams showing an example of display by the information of FIGS. 7a and 7b.

Examples of display in a case where the image information of FIG. 7b is designated by the address information of the Q-channel of FIG. 7a are shown in FIGS. 8a and 8b. FIG. 8a shows an example of a display made by a Compact Disc player capable of displaying image information. In this example, an image represented by the bit image data of FIG. 7b is designated between the character displays "ABC" and "HI" with a designated magnitude (64 bits in width and 32 bits in height).

FIG. 8b shows an example of display made in a Compact Disc player which cannot display image information. In this example, the substituting characters "DE" of FIG. 7a are displayed in place of image information. By recording these substituting characters corresponding to desired image information as substituting contents, these substituting characters enable the user to know at least the contents written by the image information.

In a case where image information can be displayed, it may be made possible to select which of the displays of FIGS. 8a and 8b should be made by a key operation or other method.

Figure 9:
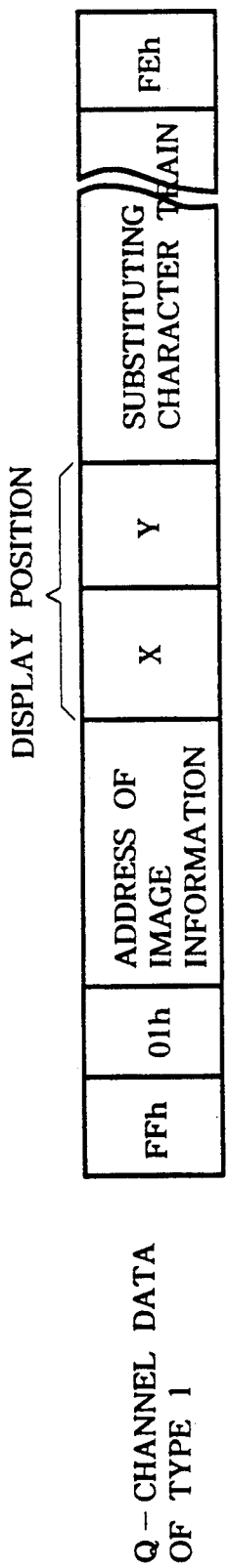
FIG. 9 is a diagram showing a type of escape sequence in the Q-channel subcoding.
Figure 10:
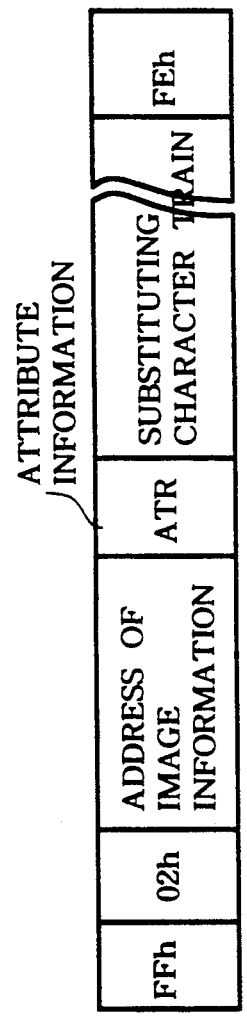
FIG. 10 is a diagram showing another type of escape sequence in the Q-channel subcoding.
Figure 11:
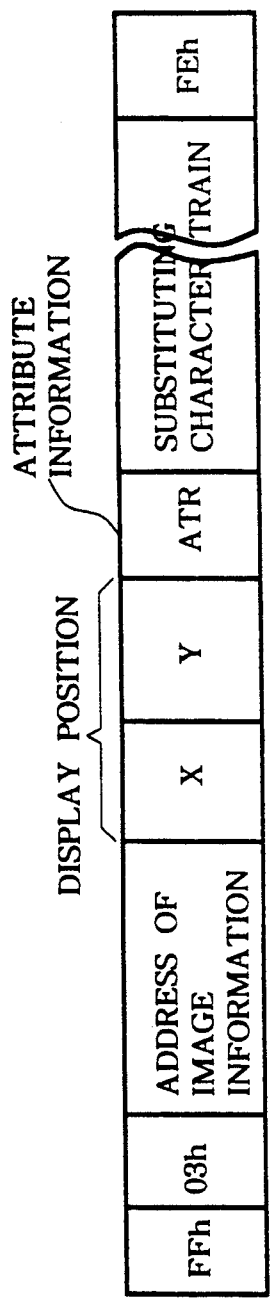
FIG. 11 is a diagram showing still another type of escape sequence in the Q-channel subcoding.

The above description has been made with respect to image display of the type 0. Formats of escape sequences of the types 1 to 3 are shown in FIGS. 9 to 11. In FIGS. 9 and 11, X and Y are information designating display position in a display. In FIGS. 10 and 11, ATR represents attribute information for character code information and image information. As attribute information ATR, for example, a color code which designates color of a character or an image, information representing size of a character, modification of a character, angle of a character and angle of a character train and information concerning a logical operation such as inversion, exclusive OR, OR and AND are recorded. As a conceivable logical operation, there will be a case, for example, where an image read from a Compact Disc is superposed upon a currently displayed image and operations in corresponding bits of these images become necessary. Assume that, for example, a display in black and white is made and that d(x, y) represents value of pixel at a display position (x, y), i(x,y) represents value of pixel of an image which is to be displayed, D(x,y) represents value of pixel after display, and L( ) represents logical operation.

The pixel value D(x,y) becomes $D(x,y) = L(d(x,y) * i(x,y))$ where D(x,y), d(x,y) and i(x,y) are 0 or 1 ("*" represents logical operation such as IMP, XOR, OR, AND). In the case of a color display, similar logical operation is made for each corresponding R.G.B. (Red, Green, Blue) bit in each pixel.

In the data format of Q-channel, the above described types 0 to 3 can be recorded mixed together. In practical application, the type used is determined depending upon the degree of function of a Compact Disc player designed. In terms of function, the type 3 only will suffice.

Figure 12:
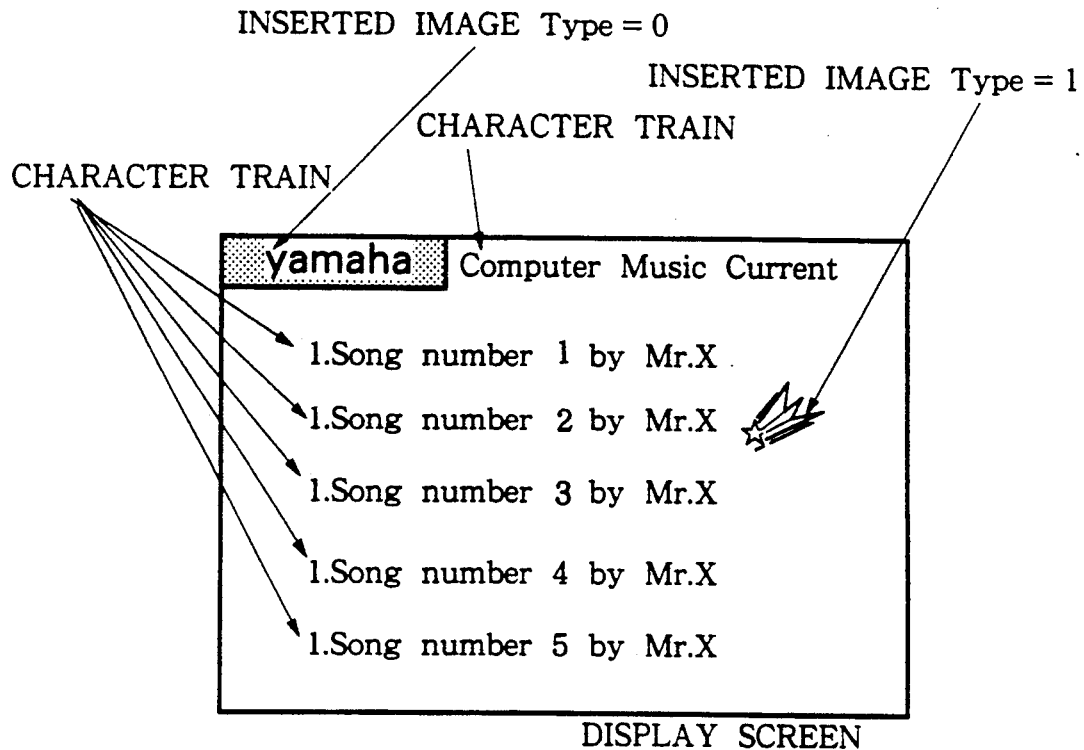
FIG. 12 is a diagram showing an example of mixed display of character information and image information.
Figure 13:
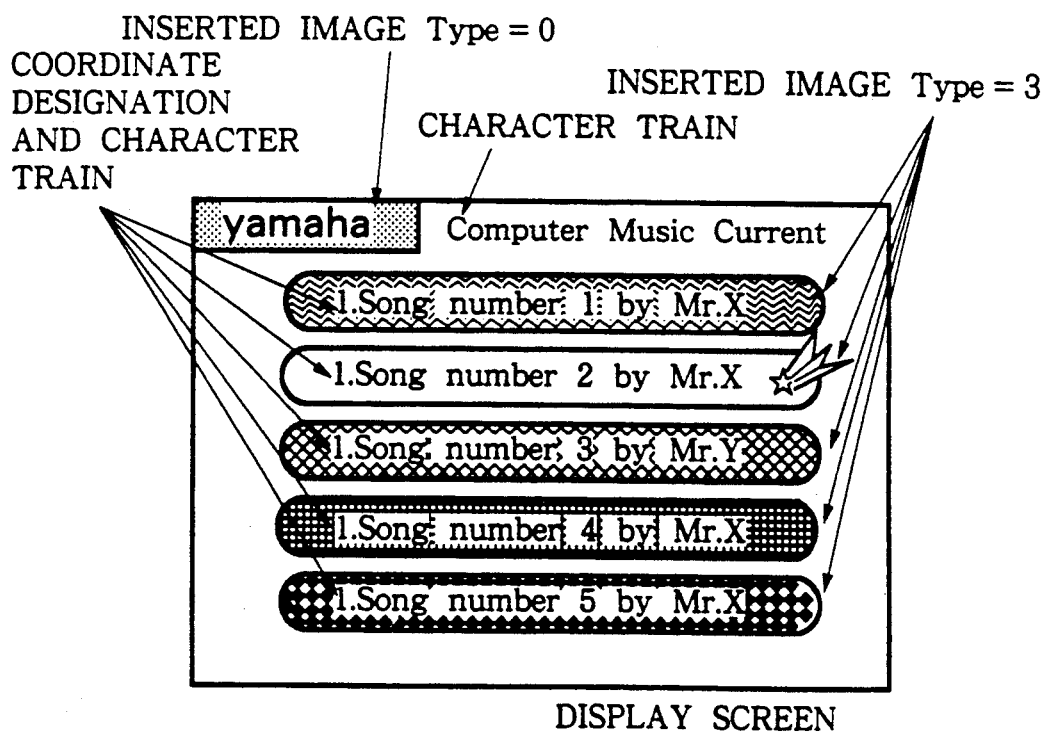
FIG. 13 is a diagram showing another example of mixed display of character information and image information.

Specific examples of mixed display of character code information and image information are shown in FIGS. 12 and 13. In FIG. 12, all music programs, names of performers and the disc title are displayed by character code information. In a portion of the disc title, an inserted image of the type 0 is displayed. In a Compact Disc player which cannot display an image, substituting character information corresponding to this inserted image is displayed in the position of the image information. Further, a mark to be affixed to a music program (e.g., a design of an image of the music) is displayed by an image of the type 1 in which the display position can be designated.

In FIG. 13, a frame with a color or a pattern is displayed as an inserted image of the type 3 at display position of each music program. Modification of characters by attribute information is also made in this example. In the foregoing manner, a versatile expression which is equal to a design of a Compact Disc jacket can be realized.

Figure 14A:
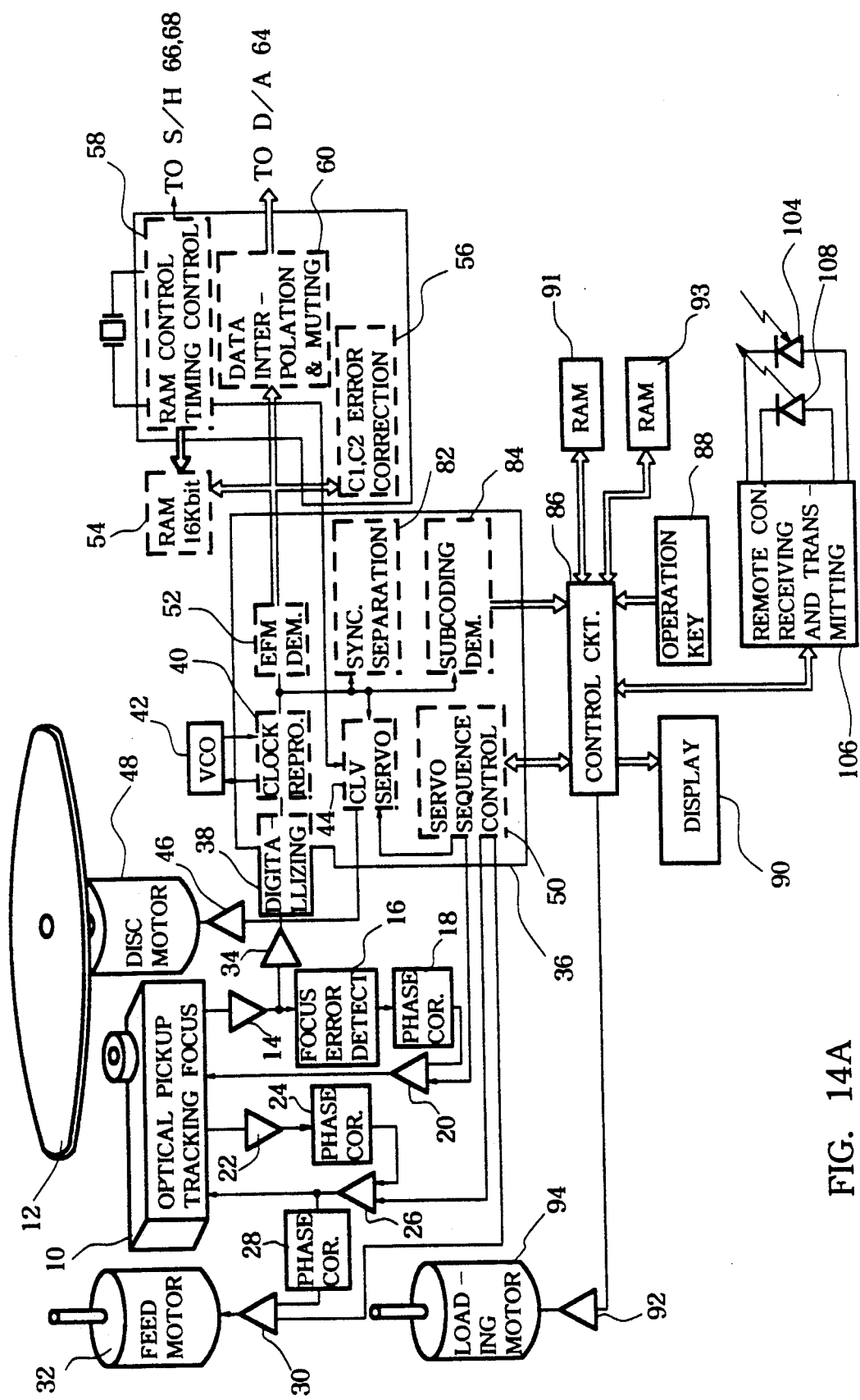
FIGS. 14A to 14C are block diagrams showing the entire construction of a Compact Disc player incorporating the display device of this embodiment.
Figure 14B:
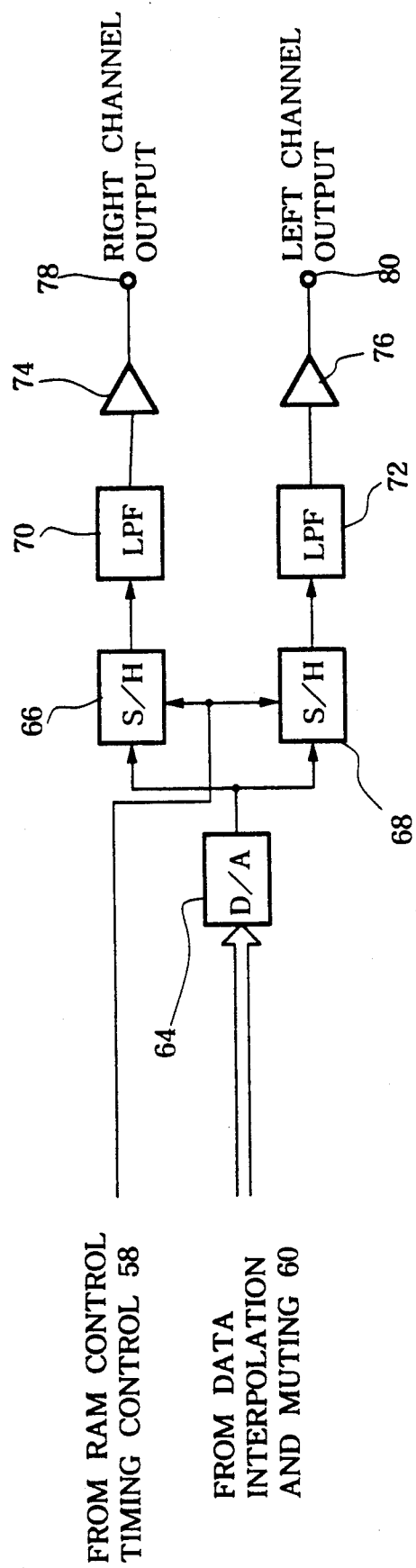
Figure 14C:
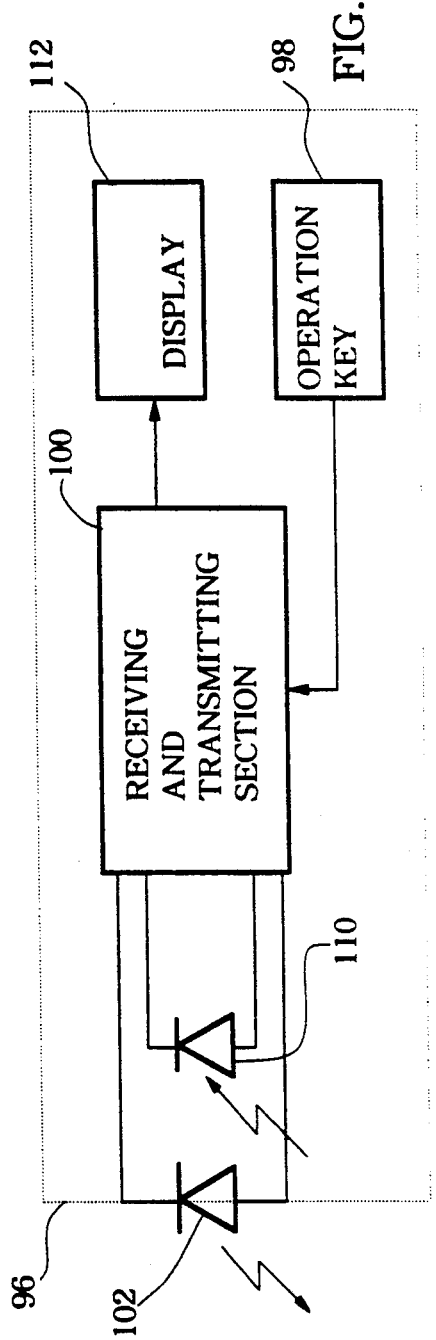

An example of the entire construction of a Compact Disc player incorporating an embodiment of the display device according to the present invention capable of performing mixed display of character code information and image information is shown in FIG. 14. In FIG. 14, the same component parts as in the embodiment of FIG. 5 are designated by the same reference characters and description thereof will be omitted.

The embodiment of FIG. 14 is different from the embodiment of FIG. 5 in that it includes a RAM 91. This RAM 91 is provided for storing, with address information, image information in the R to W-channel subcodings reproduced from a Compact Disc 12 and consists of a non-volatile RAM.

Figure 6:
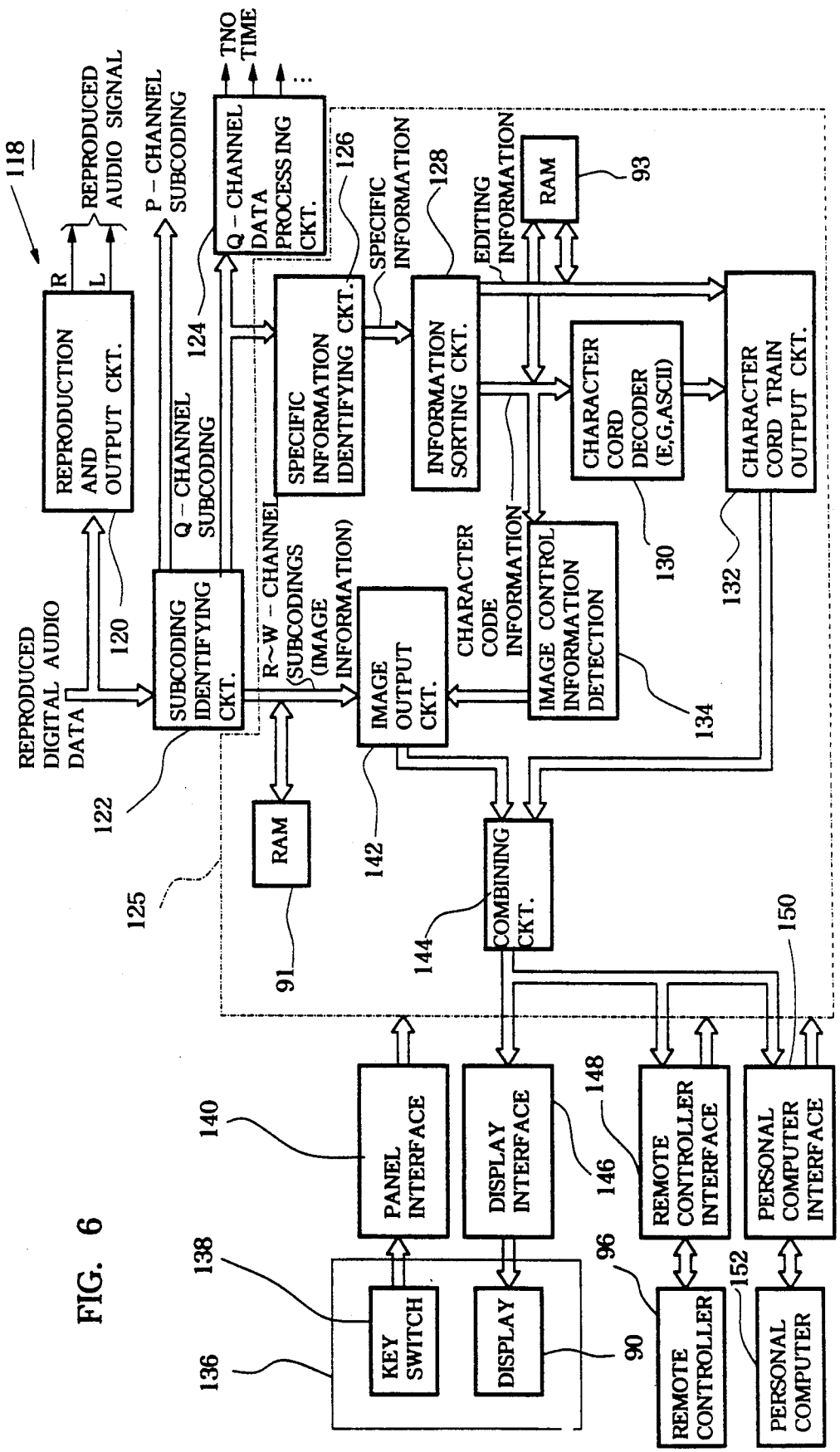
FIG. 6 is a block diagram showing another embodiment of the invention.

An embodiment of the present invention capable of performing a mixed display of character code information and image information is shown in FIG. 6. Functions of this embodiment are performed by the circuits of FIG. 14A including the digital IC 36 and the control circuit 86.

In a display device 118, digital audio data reproduced from a Compact Disc is supplied to a reproduction and output circuit 120 (corresponding to the EFM demodulation circuit 52 and subsequent circuits in FIG. 14) in which an audio signal is demodulated. The digital audio data is also supplied to a subcoding channel identifying circuit 122 (corresponding to the subcoding demodulation circuit 84 of FIG. 14) where subcodings are detected and classified into P-channel subcoding, Q-channel subcoding and R to W-channel subcodings.

A Q-channel data processing circuit 124 demodulates the Q-channel subcoding of Modes 1 to 3 and thereby obtains music program number TNO and time information TIME to cause these information to be displayed at a predetermined position in a display (display 90 or a separate display).

In a control unit 125 functioning also as a character-image decoder, specific information identifying circuit 126 identifies the Q-channel subcoding of Mode 5 by means of identifying information (ADR=0101, see FIG. 2c) and outputs this data.

An information sorting circuit 128 sorts the Q-channel subcoding of Mode 5 into character code information (basic character block data and optional character block data) and editing information (control block data) by means of a DC code (FIGS. 2d to 2f). The character code information includes an escape sequence information. This information is stored in a non-volatile RAM 93.

The control unit 125 functioning also as the character-image decoder receives designated operation information produced by operation of a key switch 138 in a front panel 136 (e.g., display of all music program titles or display of contents of music program which is currently played back) and provides corresponding character code information and editing information from the non-volatile RAM 93.

The optional character information in the character code information is constructed of a suitable optional character (Chinese characters in this embodiment) and the basic character information is constructed of ASCII code. The character code information is decoded by a character code decoder 130 to display data of a character pattern corresponding to the character code. A character code train output circuit 132 edits the decoded display data to an externally displayable character code train and outputs this character code train.

The image information of the R to W-channel detected by the subcoding channel identifying circuit 122 is stored with the address information in the RAM 91.

An image control information detection circuit 134 detects, in response to an operation designating a display mode by the key switch 138 of the front panel 136, image control information included in an escape sequence identified by ESC codes FFh and FEh from among character code information which has been read from the RAM 93.

An image output circuit 142 reads out image information from an address of the RAM 91 corresponding to the address information contained in the image control information and delivers out this information after subjecting it to a signal processing corresponding to the type code of the image control information.

A combining circuit 144 combines character information and image information together and outputs the combined information. The combined output is supplied to the display 90 in the front panel of the Compact Disc player through a display interface 146 in the Compact Disc player and mixed displays of character code information and image information are created, such as shown in FIGS. 12 and 13. The display 90 can be constructed, for example, of an LCD, LED or small CRT. The combined output is also supplied to a remote controller 96 through a remote controller interface 148 for similar display. In a case where the display capacity of the display of the remote controller 96 is too small to perform display of image information, substituting characters are used in place of image information. The same applies when the display capacity of the display 90 of the Compact Disc player is small.

The Compact Disc player can be connected bidirectionally to a personal computer 152 on a general data format level of a byte unit through a personal computer interface 150 such as a parallel interface (e.g., Centronics interface) and LAN (local area network). The personal computer 152 controls character code information and image information stored in the RAMs 93 and 91 by transferring and accumulating them and thereby enables control such as a search of the Compact Disc player from the personal computer 152. The personal computer 152 also displays mixed data of character code information and image information in its own display. Thus, by employing a personal computer of a large capacity as the personal computer 152, character code information and image information can be accumulated and controlled for a large number of Compact Discs and this information can be used for such control as displays and search of the Compact Disc player and, accordingly, operability of the disc device is improved. The disc device is particularly advantageous when it is used for a Compact Disc player having an automatic changer function for a number of Compact Discs.

An example of a character display operation by the display device 118 of FIG. 6 will be described. In a normal playback condition, an audio signal is reproduced by the reproduction and output circuit 120. In parallel with this, the P-channel subcoding, Q-channel subcoding and R to W-channel subcodings are identified by the subcoding identifying circuit 122. The Q-channel subcoding of Mode 1 is demodulated by the Q-channel data processing circuit 124 to the music program number and time information and the demodulated information is displayed by the display 90 or the display which is provided separately from the display 90. Image information of the R to W-channel subcodings is stored with the address information in the RAM 91.

The Q-channel subcoding of Mode 5 is identified by the specific information identifying circuit 126 and sorted into the character code information and editing information by the information sorting circuit 128 and stored in the RAM 93. The escape sequence in the character code information is also stored as it is. Character code information read from the RAM 93 by a command of a display mode key operation is decoded by the character code decoder 130 and is arranged by the character code train output circuit 132 to a character code pattern corresponding to editing information.

The image control information of the escape sequence included in the character code information read from the RAM 93 is detected by the image control information detection circuit 134. The image output circuit 142 reads out image information from the address of the RAM 91 corresponding to the address information in the detected image control information and outputs the image information after subjecting it to a processing corresponding to the type designated by the type code.

The character code information and the image information are combined by the combining circuit 144 and supplied to the display 90 of the Compact Disc player, the display of the remote controller 96 or the display of the personal computer 152 for display of the combined information.

Upon completion of reproduction of data from the Compact Disc, all character code information about the disc is stored in the RAM 93 and all image information is stored in the RAM 91. Accordingly, by designating display of all music programs by a display mode designation operation, such as by a key operation or the like operation, corresponding character code information is read from the RAM 93 and, simultaneously, image information is read from the RAM 91 in response to the image control information included in the character code information. So the combined character code information and image information are displayed as shown in FIGS. 12 and 13. This storage in the RAMs 93 and 91 is left even after the Compact Disc is detached from the Compact Disc player and is used for retrieval of a music program next time the same disc is played back. Since the character code information and image information of the disc have already been stored in the RAMs 93 and 91, new storing of the character information is not made this time.

The embodiment of FIG. 6 can be applied to a Compact Disc player having an automatic changer function in the same manner as in the embodiment of FIG. 1. The employment of the birectional remote controller 96 and benefits obtained therefrom in the embodiment of FIG. 6 is also the same as in the embodiment of FIG. 1.

The present invention can be applied also to CDV (Compact Disc-Video) and other discs of Compact Disc standard and playback devices playing back such discs.

What is claimed is:

1. A reproducing apparatus for reproducing recorded digital audio data on a disc recording medium, the digital audio data including an audio signal and a plurality of Q-channel subcodings, the reproducing apparatus comprising:
    data reproducing means for detecting digital audio data recorded on the disc recording medium to reproduce the audio signal and the plurality of Q-channel subcodings corresponding to the audio signal;
    specific information identifying means for detecting identifying information from one of the plurality of Q-channel subcodings to identify specific information imparted in the identifying information;
    information sorting means for sorting the specific information into character code information and editing information;
    decoding means for decoding the character code information into a predetermined character code; and
    character code train output means for editing the predetermined character code decoded by said decoding means as a displayable character code train in accordance with the editing information and outputting the displayable character code train.

2. A reproducing apparatus as defined in claim 1, wherein said character code information comprises basic character code information.

3. A reproducing apparatus as defined in claim 2, wherein said basic character code information consists of ASCII alphabetic characters and figures.

4. A reproducing apparatus as defined in claim 2, wherein said character code information further comprises optional character code information.

5. A reproducing apparatus as defined in claim 1, wherein said editing information comprises a selection code for identifying sections of the character code train, the sections being selectable by a user by designating said selection code.

6. A reproducing apparatus as defined in claim 1, further comprising:
    image information detection means for detecting and outputting image information recorded on subcoding channels other than the Q-channel of the disc recording medium in synchronization with the data reproducing means;
    image control information detection means for detecting image control information for the image information from a character code train decoded by the decoding means; and
    image output means for controlling the detected image information in response to the detected image control information and outputting displayable controlled image information with the displayable character code train.

7. A reproducing apparatus as defined in claim 6, wherein the character code train has a designated position, and wherein said displayable image information comprises information concerning an image which is displayable as a part of the displayable character code train and another displayable character code train which is outputted immediately thereafter and information concerning an image which is displayable at a designated position regardless of a designated position of the character code train.

8. A reproducing apparatus as defined in claim 1, further comprising display means for displaying the displayable character code train outputted by said character code train output means.

9. A method for reproducing digital audio data recorded on a disc recording medium, the digital audio data including an audio signal and a plurality of Q-channel subcodings, the method comprising the steps of:
    detecting digital audio data recorded on the disc recording medium to reproduce an audio signal and a plurality of Q-channel subcodings corresponding to the audio signal;

detecting identifying information from one of the Q-channel subcodings to identify specific information imparted in the identifying information;

sorting the specific information into character code information and editing information;

decoding the character code information into a predetermined character code; and editing the predetermined character code as a displayable character code train in accordance with the editing information and outputting the displayable character code train.

10. A method as defined in claim 9 further comprising, displaying the displayable character code train.

* * * * *